3,406,221
INTERPOLYMERS CONTAINING VINYL ACETATE, HYDROXY ESTERS OF DICARBOXYLIC ACIDS, AN ESTER PLASTICIZING MONOMER AND AN ALKYL ACID MALEATE OR FUMARATE
Howard J. Wright and Michael B. Prenosil, Kansas City, Mo., assignors to Cook Paint & Varnish Company, Kansas City, Mo., a corporation of Delaware
No Drawing. Filed Nov. 24, 1965, Ser. No. 509,628
6 Claims. (Cl. 260—856)

The present invention relates to coating compositions containing a vinyl acetate copolymer.

Because of its low cost, vinyl acetate is an attractive material for use in coating compositions, e.g. automotive finishes. Consequently, considerable effort has been directed towards developing vinyl acetate copolymers which might be useful in this way. Unfortunately, however, the copolymerization of vinyl acetate presents a number of serious problems. For example, it does not copolymerize well with other vinyl monomers. Instead, the vinyl acetate homopolymerizes to give polyvinyl acetate and the other monomer, such as ethyl acrylate, also homopolymerizes. A small amount of copolymer may be formed but the resulting three resins are usually incompatible and form cloudy films of low gloss and poor properties.

In view of the foregoing, the principal object of the invention is to provide a vinyl acetate copolymer which is free from prior art problems and is uniquely adapted for use in coating compositions. A more specific object of the invention is to provide a coating composition which contains a vinyl acetate copolymer and is capable of forming clear and durable films of outstanding properties. Other objects will also be hereinafter apparent from the following detailed description of the invention.

Broadly stated, the copolymer of the invention comprises: (1) vinyl acetate as the main polymer component; (2) a hydroxy compound having the formula:

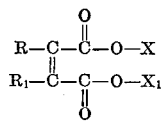

wherein R and $R_1$ are hydrogen or lower alkyl; X is hydrogen or a non-hydroxy aryl or alkyl, e.g. alkyl containing up to 18 carbon atoms, benzyl or phenyl; and $X_1$ is a mono- or polyhydroxy-containing aliphatic group, e.g. hydroxyalkyl, such as

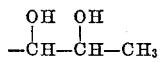

or —$CH_2$—$CH_2$—OH or —Y—$OY^1$—OH wherein Y and $Y^1$ are alkylene, of, for example, one to four carbon atoms; (3) a plasticizing monomer, e.g. dialkyl maleate or fumarate, such as dibutyl or dioctyl maleate, or an alkyl acrylate such as ethyl acrylate, butyl acrylate or 2-ethylhexyl-acrylate; and (4) alkyl acid maleate or fumarate, the alkyl being long or short chain, e.g. 1–18 carbon atoms. Surprisingly, this four-component polymer gives a highly effective coating when mixed with an alkylated melamine-formaldehyde resin in suitable liquid vehicle, applied to a substrate and cured.

The results of the invention are highly unique and unexpected. This is shown by the fact that replacing the specified hydroxy compound with another hydroxy ester, e.g. hydroxypropylmethacrylate, does not offer the advantages of the present product. Another unusual aspect of the invention is that the copolymerization may be effectively carried out in the presence of an alkanol, e.g. an alkanol containing up to 9 carbon atoms, such as methanol, butanol, octanol or nonanol, but does not proceed satisfactorily in the presence of xylene or like hydrocarbon solvent.

The hydroxy compound, component (2) above, is preferably a mixed ester of maleic of fumaric acid, for example, the mixed ester of (a) ethylene glycol or other lower alkylene glycol, e.g. propylene glycol, (b) monohydric alcohol, particularly alkanol of up to nine carbon atoms or so, such as propanol, isopropanol, butanol, and isobutanol; and (c) maleic acid, fumaric acid or their anhydrides, itaconic acid and/or aconitic acid. A particularly important mixed ester of the type indicated is butyl, hydroxy propyl maleate male by esterifying maleic anhydride or maleic acid with propylene glycol and butanol in conventional fashion.

Typical plasticizing monomers have been referred to above. However, other such monomers which demonstrate a plasticizing function may also be used herein lieu of, or in addition, to those specifically mentioned. Alkyl substituents in these monomers may vary greatly in length with $C_4$ to $C_8$ or higher being representative.

The alkyl acid maleate or fumarate is advantageously butyl acid maleate or fumarate. However, other alkyls, e.g. propyl, amyl, lauryl, cetyl and stearyl, may be used in lieu of the butyl radical of this component.

In a preferred embodiment of the invention, the copolymer comprises vinyl acetate, butyl hydroxy propyl maleate, dibutyl or dioctyl maleate, and butyl acid maleate. The maleates may be replaced by the fumarates in each instance.

The proportions of the various components making up the copolymer of the invention can be widely varied depending upon other operating factors, e.g. the components used. Usually, however, the proportions selected are such that the polymer has an acid number of 5–50 and a hydroxy number of from 30–90. Generally speaking, these values may be realized by using, on a weight basis, 45–85% vinyl acetate; 5–35% of the hydroxy-containing compound; 5–15% of the plasticizing monomer and 5–30% of the alkyl acid maleate or fumarate. However, proportions outside these ranges may also be useful if the indicated acid and hydroxy values are realized.

As suggested above, it is an important aspect of the invention that the polymerization is carried out in an alkanol solvent. Advantageously, the components are added to the solvent along with a suitable polymerization catalyst, e.g. a peroxide or azo compound, and the resulting mixture is heated to reflux until a relatively thick but essentially clear solution is obtained (usually from one to eight hours). The solution may then be diluted to the desired viscosity and mixed with alkylated melamine-formaldehyde precondensates, e.g. butylated methylol melamine, to prepare the desired coating formulation.

The invention is illustrated, but not limited, by the following examples wherein parts and percentages are by weight:

Example 1.—49.14 parts of vinyl acetate were mixed with 14 parts butyl hydroxy propyl maleate, 7 parts dibutyl maleate, 14 parts butyl acid maleate (i.e. the half ester), and 0.8 parts azobisisobutyronitrile catalyst. The mixture was fed into a refluxing mixture of 8 parts isopropyl alcohol and 67 parts butanol over a period of 6 hours after which the product was reduced further with solvent (xylol/butanol) to give a product of 54% solids, P-Q viscosity (Gardner-Holt), and 24.4 acid number.

The product was mixed with butylated melamine-formaldehyde in xylol/butanol (30% melamine-formaldehyde, 70% vinyl acetate polymer, solids basis), coated on a metal substrate and cured at 250° F. in 20 minutes to give a good, clear film with a Sward hardness of 50 and especially usable for surface coatings requiring excellent exterior durability.

Example 2.—Example 1 was repeated using dioctyl maleate in one instance and 2-ethyl hexyl acrylate in another in lieu of dibutyl maleate with essentially the same results.

It will be appreciated that various modifications may be made in the invention described herein. Hence, the scope of the invention is defined in the following claims wherein

We claim:
1. A copolymer comprising on a weight basis:
   (1) 45–85% vinyl acetate;
   (2) 5–35% of a hydroxy compound of the formula:

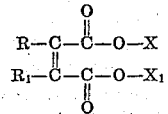

wherein R and $R_1$ are hydrogen or lower alkyl; X is hydrogen or non-hydroxy aryl or alkyl; and $X_1$ is a hydroxy-aliphatic group;
   (3) 5–15% of a plasticizing monomer selected from the group consisting of dialkyl maleates, dialkyl fumarates and alkyl acrylates; and
   (4) 5–30% of an alkyl acid maleate or fumarate.

2. The copolymer of claim 1 wherein component (2) is butyl hydroxy propyl maleate or fumarate; component (3) is dibutyl or dioctyl maleate and component (4) is butyl acid maleate.

3. The copolymer of claim 2 having an acid number of 5–50 and a hydroxy number of 30–90.

4. The process of preparing the copolymer of claim 1 which comprises polymerizing said components (1), (2), (3), and (4) in an alkanol medium.

5. A coating composition comprising the polymer of claim 1.

6. A coating composition comprising the polymer of claim 1 and an alkylated melamine-formaldehyde resin.

References Cited
UNITED STATES PATENTS

| | | | |
|---|---|---|---|
| 3,082,184 | 3/1963 | Falgiatore et al. | 260—856 |
| 3,156,740 | 11/1964 | Bussel | 260—856 |
| 3,270,088 | 8/1966 | Hicks | 260—856 |
| 3,375,227 | 3/1968 | Hicks | 260—856 |

MURRAY TILLMAN, *Primary Examiner.*

JOHN C. BLEUTGE, *Assistant Examiner.*